US007647387B2

(12) United States Patent
Bellare et al.

(10) Patent No.: US 7,647,387 B2
(45) Date of Patent: Jan. 12, 2010

(54) METHODS AND SYSTEMS FOR RULE-BASED DISTRIBUTED AND PERSONLIZED CONTENT DELIVERY

(75) Inventors: Kiran Gurudutt Bellare, San Jose, CA (US); Sachin Desai, San Francisco, CA (US); Joshua Michael Dobies, Oakland, CA (US)

(73) Assignee: Oracle International Corporation, Redwood Shores, CA (US)

( * ) Notice: Subject to any disclaimer, the term of this patent is extended or adjusted under 35 U.S.C. 154(b) by 910 days.

(21) Appl. No.: 09/728,724

(22) Filed: Dec. 1, 2000

(65) Prior Publication Data

US 2002/0069261 A1 Jun. 6, 2002

(51) Int. Cl.
*G06F 15/16* (2006.01)

(52) U.S. Cl. .................. 709/218; 209/217; 209/219
(58) Field of Classification Search .................. None
See application file for complete search history.

(56) References Cited

U.S. PATENT DOCUMENTS

| | | | | |
|---|---|---|---|---|
| 5,796,952 | A * | 8/1998 | Davis et al. | 709/224 |
| 5,870,546 | A * | 2/1999 | Kirsch | 709/205 |
| 5,948,061 | A | 9/1999 | Merriman et al. | |
| 6,023,684 | A * | 2/2000 | Pearson | 705/36 R |
| 6,076,166 | A | 6/2000 | Moshfeghi et al. | |
| 6,182,142 | B1 | 1/2001 | Win et al. | |
| 6,327,609 | B1 * | 12/2001 | Ludewig et al. | 709/203 |
| 6,401,094 | B1 * | 6/2002 | Stemp et al. | 707/10 |
| 6,421,733 | B1 * | 7/2002 | Tso et al. | 709/246 |
| 6,477,575 | B1 | 11/2002 | Koeppel et al. | |
| 6,578,007 | B1 | 6/2003 | Howes et al. | |
| 6,734,886 | B1 * | 5/2004 | Hagan et al. | 715/853 |
| 6,763,334 | B1 | 7/2004 | Matsumoto et al. | |

(Continued)

OTHER PUBLICATIONS

Li, Chung-Sheng, "Distributed Application Service for Internet Information Portal," May 2000, IEEE, vol. 4, pp. 289-292.*

(Continued)

*Primary Examiner*—Patrice Winder
*Assistant Examiner*—Azizul Choudhury
(74) *Attorney, Agent, or Firm*—Townsend and Townsend and Crew LLP

(57) ABSTRACT

Methods and systems are disclosed for delivering personalized content from a first server such as a merchant Web server to a computer accessing a second server such as an affiliate Web server. A system according to the present invention includes a merchant Web server and an affiliate Web server, the affiliate Web server being coupled to the merchant Web server over a computer network. A database of user information is accessible to the merchant Web server, as is a rule base that includes a plurality of configurable rules. User identification may be collected from the computer accessing a Web site controlled by the affiliate Web server and the collected user identification may be sent to the merchant Web server, along with a request for content. User information corresponding to the collected user identification may then be retrieved from the database. The user information obtained from the database may be applied to the plurality of rules and selected content may be returned to the affiliate Web server in response to the request for content. The returned content is selected based upon the result of the application of the user information to the plurality of rules.

34 Claims, 3 Drawing Sheets

U.S. PATENT DOCUMENTS

| | | | |
|---|---|---|---|
| 6,871,213 B1 | 3/2005 | Graham et al. | |
| 6,941,339 B1* | 9/2005 | McMichael | 709/203 |
| 7,072,856 B1* | 7/2006 | Nachom | 705/26 |
| 2001/0020242 A1* | 9/2001 | Gupta et al. | 707/501.1 |

OTHER PUBLICATIONS

Oracle Corporation, "Oracle Web Cache Administration and Deployment Guide", Release 1.0.2, Part No. A86722-01, http://download.oracle.com/docs/cd/A97337_01/ias102_otn/cache.102/a86722/title.htm, printed Jul. 16, 2007.

Oracle Corporation, "Oracle Web Cache Concepts", Oracle Web Cache Administration and Deployment Guide, Release 1.0.2, Part No. A86722-01, http://download.oracle.com/docs/cd/A97337_01/ias102_otn/cache.102/a86722/concepts.htm, printed Jul. 16, 2007.

Oracle Corporation, "Introduction to Oracle Web Cache", Oracle Web Cache Administration and Deployment Guide, Release 1.0.2, Part No. A86722-01, http://download.oracle.com/docs/cd/A97337_01/ias102_otn/cache.102/a86722/intro.htm, printed Jul. 16, 2007.

* cited by examiner

METHODS AND SYSTEMS FOR RULE-BASED DISTRIBUTED AND PERSONLIZED CONTENT DELIVERY

BACKGROUND OF THE INVENTION

1. Field of the Invention

The present invention relates generally to the delivery of personalized content over computer networks, such as the Internet.

2. Description of the Related Art

The relative low cost of transferring information over computer networks such as the Internet has deluged consumers with sales and marketing information. Much of the information received by consumers is transmitted upon request, such as when consumers view a specific Web page from a favorite or vendor. Some information, however, is pushed to the consumer, such as the case with advertisements, sometimes in the form of banner ads occupying a portion of the active area of a Web browser. Most often, the consumer has not requested the banner ad to be displayed. Its display results from an agreement between the owner of the Web site and the advertiser. Such ads are often rotated, so that repeat visitors to the Web site do not become habituated to the same advertisement each time they visit the Web site.

Some Web sites also feature links to other web sites featuring businesses with which the Web site maintains a strategic alliance or other contractual relationship. Such other Web sites may be termed affiliate Web sites. Such affiliate Web sites usually offer complimentary products and/or services. The affiliate Web sites may feature advertisements for products or services of the Web site(s) with which they are affiliated. For maximum effectiveness, however, such advertisements should be delivered in a controlled manner and the content thereof should be customized to a target audience or even to a targeted individual. However, conventional practice appears to be limited to blind rotation of static content and/or to changing the content display frequency to meet contractual terms. What are needed are methods and systems to maximize the effectiveness of content (such as advertising content, for example) to be displayed on Web sites. To maximize the effectiveness of the content and the delivery thereof requires the content to be customized and dynamically responsive to the specific individual or class of individuals viewing the content.

SUMMARY OF THE INVENTION

It is, therefore, an object of the present invention to provide methods and systems for maximizing the effectiveness and delivery of content over the Internet. It is another object of the present invention to provide customized content that is dynamically responsive to those that view the content.

In accordance with the above-described objects and those that will be mentioned and will become apparent below, a method for a first server to select content to be displayed on a computer accessing a Web site of a second server, according to the present invention, includes steps of collecting user identification data from the computer accessing the Web site; sending the collected user identification data to the first server; retrieving user information corresponding to the user identification data from a database of user information accessible to the first server; applying the retrieved user information to a rule base including a plurality of rules; selecting content to be displayed on the second server's Web site based upon a result of the application of the retrieved user information to at least one of the plurality of rules, and causing the Web site to display the selected content to the accessing computer.

One or more of the plurality of rules may be customizable. The user identification data may be included in at least one file (such as a cookie) stored on the accessing computer. The causing step may include a step of sending the selected content to the second server. The second server may further carry out a step of integrating the selected content into the Web site displayed to the user. The second server may further carry out a step of transmitting the selected content to the accessing computer and the browser running on the accessing computer may integrate the selected content into the currently displayed page of the Web site. The transmitting step may be carried out via HTTP and/or TCP/IP. The causing step may include a step of sending the address of the selected content to the second server. The second server may carry out a step of fetching the selected content at the address sent by the first server and integrating the fetched selected content into the currently displayed page of the Web site. The second server may send the address (such as an Internet address) of the selected content to the accessing computer and the accessing computer may fetch the selected content at the address sent by the second server and integrate the fetched selected content into the currently displayed page of the Web site. The content may include an advertisement, a product recommendation and/or a link to another Web site, for example. The selected content may include a combination of the product recommendation and a deep link into the other Web site where the recommended product is featured. The applicability of one or more of the plurality of rules of the rule base may be selectively limited by one or more parameters. The parameter(s) may include time, date, geography, age, sex, income level, browser type and record of past purchases or inquiries, for example. The method may also include a step of updating the database of user information based upon the activity of the user of the accessing computer. The sending step may send a request for the selected content along with the collected user identification data.

The present invention is also a system that includes a merchant Web server; an affiliate Web server, the affiliate Web server being coupled to the merchant Web server over a computer network; a database of user information accessible to the merchant Web server; a rule base including a plurality of configurable rules, the rule base being accessible to the merchant Web server; a first process to collect a user identification from a computer accessing a Web site controlled by the affiliate Web server and for sending the collected user identification to the merchant Web server along with a request for content; a second process for retrieving user information from the database corresponding to the collected user identification and a third process for applying user information obtained from the database to the plurality of rules and for returning selected content to the affiliate Web server in response to the request for content, the returned content being selected based upon a result of applying the user information to the plurality of rules.

The third process may be further configured to send the selected content to the affiliate Web server. The affiliate Web server may be further configured to integrate the selected content into the Web site displayed to the user. The affiliate Web server may be further configured to transmit the selected content to the accessing computer and the browser running on the accessing computer may be configured to integrate the selected content into the Web site displayed to the user. The affiliate Web server may be further configured to fetch the content at the address sent by the third process and to integrate the fetched content into the currently displayed page of the Web site. The affiliate Web server may be further configured to send the address of the content to the accessing computer and the accessing computer may be configured to fetch the content at the address sent by the affiliate Web server and to integrate the fetched content into a currently displayed page of the Web site. The system may also include a fourth process to update the database of user information based upon an activity of a user of the accessing computer. The first process may also collect, from the accessing computer, a request for the selected content along with the collected user identification data. The system may also include a rules engine configured to enable each of the plurality of rules to be customized and configured to enable a creation of new rules.

The present invention, according to another embodiment thereof, is also a method of delivering personalized content from a first server to a computer accessing a second server, including steps of receiving a request for the personalized content from the accessing computer, the accessing computer having accessed a Web page that may include embedded code configured to send the request for personalized content to the first server over a computer network along with selected user identification data; retrieving user information corresponding to at least one of the user identification data and the accessed Web page from a database of user information accessible to the first server; applying the retrieved user information to a rule base including a plurality of rules; selecting content to be posted in the accessed Web page based upon a result of the application of the retrieved user information to at least one of the plurality of rules, and sending at least one of the selected content and an address of the selected content to the accessing computer for posting into the accessed Web page.

DESCRIPTION OF THE INVENTION

Functional Description

Figure 1:
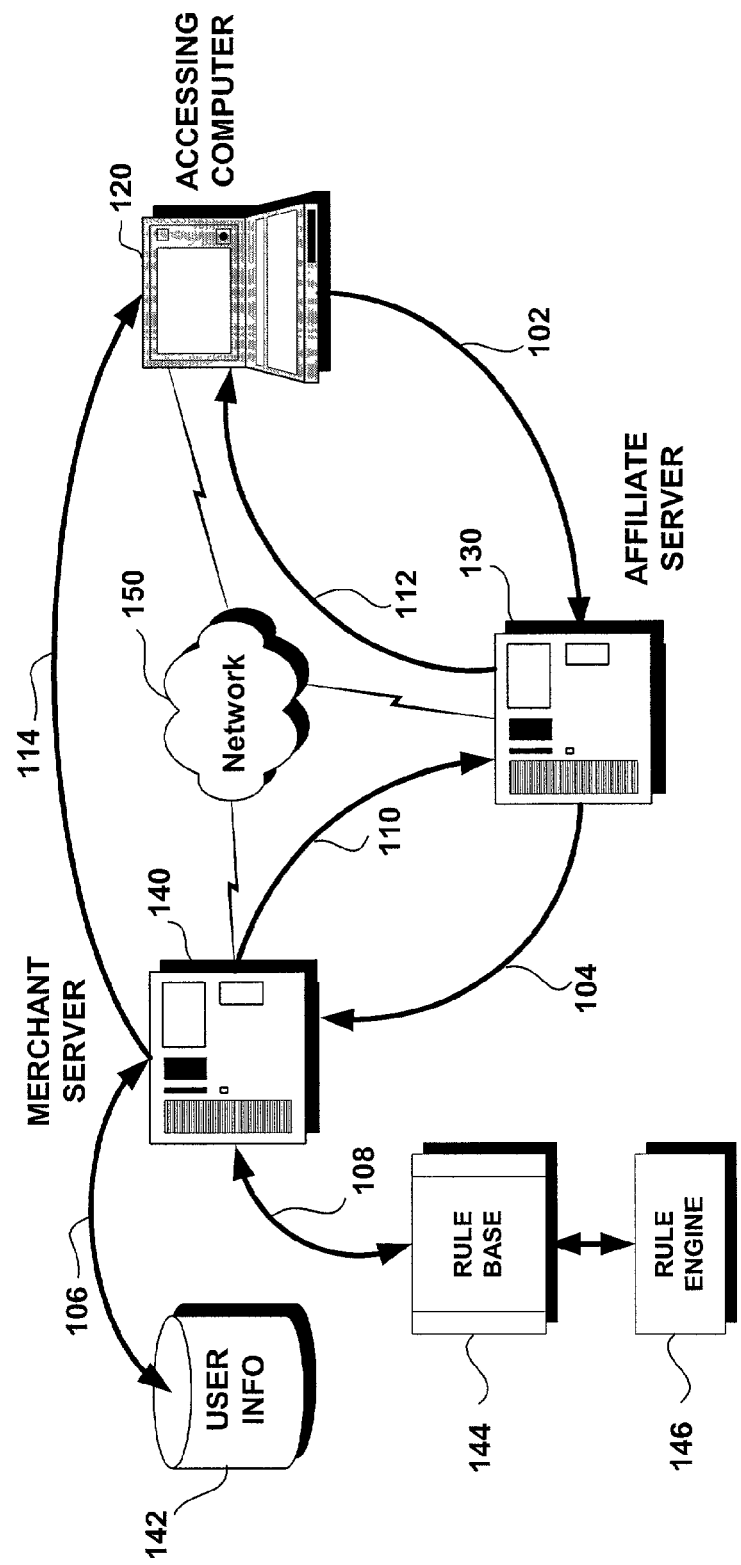
FIG. 1 is a representation of the method and systems for rule-based personalized content delivery, according to an embodiment of the present invention.

FIG. 1 is a representation of methods and systems for rule-based distributed and personalized content delivery, according to embodiments of the present invention. As shown therein, reference numeral 140 represents a merchant server that is coupled to an affiliate server 130 via a computer network 150 (including, for example, the Internet). The organization controlling the affiliate server 130 may have a contractual relationship (or other duty or agreement) with the organization that controls the merchant server 140 such that the affiliate server 130 is to cause personalized content (such as an advertisement) to be displayed on its Web site(s), the content being personalized by the merchant server 140. The merchant server 140, according to the present invention, is coupled to, or has access to a database 142 of user information. The merchant server 140 is also coupled to, or has access to, a rule base that includes a plurality of rules.

In operation, a computer 120 (and/or any device or service adapted to access the network 150) may access the affiliate server 130 by, for example, logging onto or otherwise accessing the affiliate server 130's Web site, as shown by arrow 102. The affiliate server 130 (or a process running on the affiliate server 130) may then collect selected user identification data from the accessing computer 120. The user identification data collected from the accessing computer 120 by the affiliate server 130 may then be sent by the affiliate server 130 to the merchant Web server 140, as shown by the arrow 104 in FIG. 1. Along with the collected user identification data, the affiliate server 130 may send the merchant Web server 140 a request for content. Preferably, the request for content is a request for content that has some relevance to the user of the computer 120 and thus to the user identification data collected from the accessing computer 120. That is, the request for content is a request for personalized content, based at least in part upon the user identification data collected from the accessing computer 120. The request for content by the affiliate server 130, therefore, may include or consist of a request for content that has some relevance to the user identified (whether personally or anonymously) in the user identification data collected from the accessing computer 120.

The merchant Web server 140 may then access the database of user information 142 as shown at 106 to retrieve user information therefrom that corresponds to, somehow matches or is mapped to the collected user identification data. The user information database 142 may include user profile information including, for example, parameters indicative of demographic information such as the user's name, address, age, income level, payment instruments, prior purchases and/or other information such as Web sites visited, Web browser used and/or any other information automatically collected from the user and/or solicited from and provided by the user of the accessing computer 120. The user information stored in the user information database 142 may be mapped to a specifically identified user, or may be mapped to a specific class of customers or users.

The user information retrieved from the user information database 142 that corresponds to the collected user identification data may then be applied to a rule base 144 (a store or database of rules) that includes a plurality of rules, as shown by arrow 108. The rules, according to the present invention, may be fully customizable to achieve virtually any business goal, such as to carry out targeted advertising, to carry out an advertising campaign or for purposes wholly unrelated to advertising. A rule engine 146 may also be provided, thereby enabling the merchant (the business or organization that owns and/or controls the merchant Web server 140) and/or other duly authorized parties to cancel, modify and/or create new rules at will. The rules engine 146 enables a swiftly response to dynamic market conditions and changes in marketing strategies by enabling the modification of existing rules and/or the creation of entirely new ones. The combination of the user information database, the rule base 144 and the rules engine 146 allows the creation of focused advertising campaigns that may be limited in time, geography and/or any parameter collected from and/or derived from the user information retrieved from the user information database 142. For example, a rule within the rule base 144 may include an "If...then..." structure such as "If (parameterX>Y) then Z". For example, parameterX may be the user income level, Y may be a selectable threshold amount and Z may include, point to or otherwise identify some personalized content, as is discussed below. In this manner, higher income bracket individuals may be shown advertisements for luxury items and/or services while lower income individuals may be shown content advertising less costly goods and/or services. The effectiveness of such an advertising campaign may, therefore, be continuously monitored and the rules governing the distribution of the content may be periodically modified to achieve the desired response rate and/or any other measure. Indeed, the user information retrieved from the user information database 142 is applied to one or more of the plurality of rules in the rule base 144. Based upon the result of applying the retrieved user information to the rule base 144, selected content may be returned to the affiliate Web server 130 as shown at 110. The returned content, according to the present invention, is selected by the merchant Web server 140 based upon the result of the application of the user information retrieved from the user information database 142 to the plurality of rules of the rule base 144. The affiliate Web server 130 may then integrate the returned content into its Web site for viewing by the user of the accessing computer 120, or may send the returned content directly to the accessing computer 120 as shown at 112 (or may send a pointer, address or other reference to the content on the merchant Web server 140), whereupon the browser (or other rendering software) running on the accessing computer 120 integrates the returned content into the Web page that is currently displayed or that is to be displayed. Alternatively, the merchant server 140 may send the selected content referenced by the affiliate Web server 130 (or a network address thereof) directly to the accessing computer 120, whereupon the selected content is integrated into the currently viewed Web page.

According to an embodiment of the present invention, the user identification information may be stored in one or more files stored on the accessing computer 120. For example, the user information may be stored in a cookie stored on the accessing computer 120. Cookies generally refer to text files that are stored on a user's computer by a server. Cookies can store a variety of information, including user preferences and/or any information that a Web server may use to customize or personalize a Web page for a particular user. The information stored in a cookie may have been provided by the user or collected transparently from the user and helps a server in a client/server network to customize the user's experience the next time he or she visits the Web site. If no cookie is found in the accessing computer 120, an anonymous cookie may be created and stored therein. Preferably, at least one of the rules of the rule base 144 may provide for the eventuality of an anonymous cookie or no cookie at all (as would be the case if the user of the accessing computer 120 had disabled cookies in his or her browser).

Figure 2:
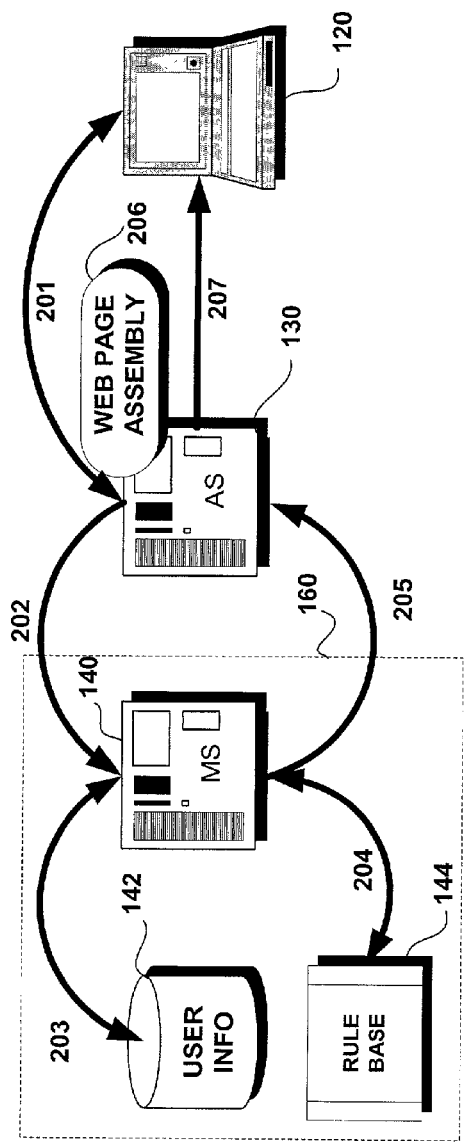
FIG. 2 is a representation of the method and systems for rule-based personalized content delivery according to the present invention, wherein the assembly of the Web page(s) to be viewed by the user is (are) carried out at the affiliate Web server.

FIG. 2 is a representation of the method and systems for rule-based personalized content delivery according to the present invention, wherein the assembly of the Web page to be viewed by the user is carried out at the affiliate Web server 130. From the affiliate Web server 130's point of view, the user's computer 120 logs onto or otherwise accesses the affiliate 130's Web site, as shown at 201. Prior to sending the requested Web page to the browser on the accessing computer 120, the affiliate Web server 130 collects the user information from the accessing computer 120, which user information may be stored in the accessing computer 120 as a cookie. The affiliate Web server 130 may then send the collected user identification data to a marketing engine 160 coupled thereto over the Internet and/or other computer network, as shown at 202. The marketing engine 160 may include the merchant server 140, the database of user information 142 and the rule base 144. Along with the collected user identification data, the affiliate Web server 130 may send a Hyper Text Transfer Protocol (http) request for personalized content to the marketing engine 160. The merchant Web server 140 of the marketing engine 160 receives the collected user identification data and the request for personalized content, requests and obtains user information corresponding to the received user identification data from the database 142 as shown at 203 and applies the user information from the user information database 142 to one or more of the plurality of rules stored in the rule base 144, as shown at 204. Based upon the result of the application of the obtained user information to the rules of the rule base 144, the merchant Web server 140 selects or is provided with selected content to be posted in the Web page requested by the accessing computer 120 and sends the selected content (either the content itself, such as html code, or an address or pointer to the selected content) to the affiliate Web server 130, as shown by arrow 205. The affiliate Web server 130 then dynamically integrates the selected content (after having received it from the merchant Web server 140 or fetched it from the address supplied by the merchant Web server 140) into the requested Web page, as shown at 206. The requested Web page, along with the selected personalized content posted therein, may then be pushed at 207 to the accessing computer 120, to be displayed by the browser or other content rendering application running thereon. The approach of FIG. 2 has the advantage of not relying upon any specific feature in the browser or rendering application running on the accessing computer 120, but relies upon the affiliate Web server 130 to integrate the selected personalized content into their Web page.

Figure 3:
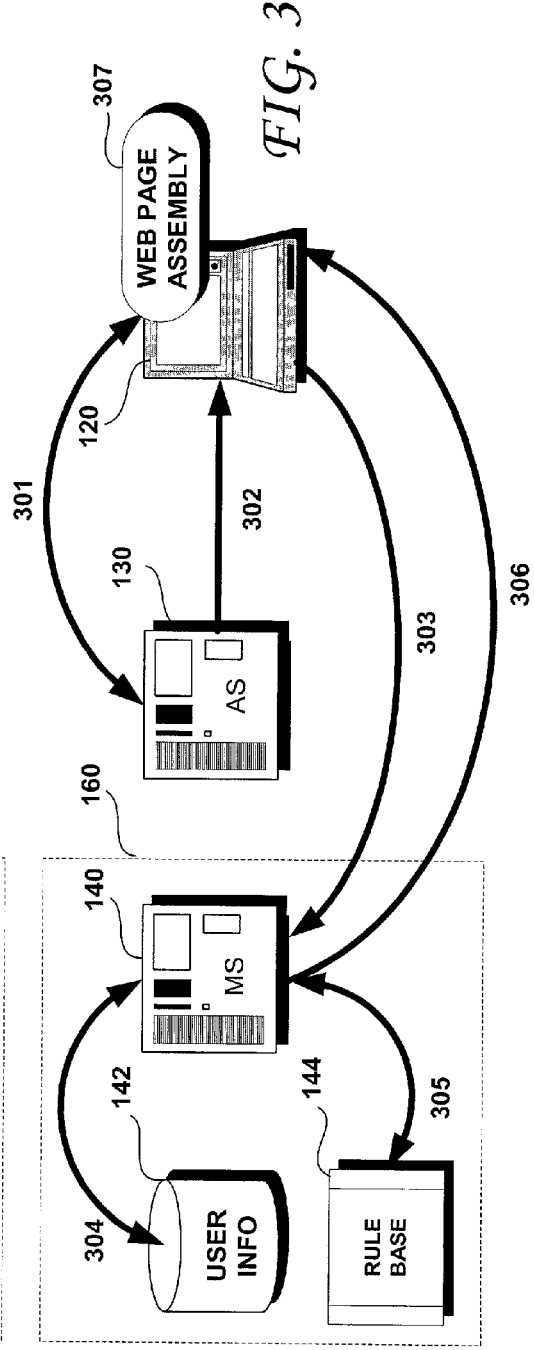
FIG. 3 is a representation of the method and systems for rule-based personalized content delivery according to the present invention, wherein the assembly of the Web page(s) to be viewed by the user is (are) carried by the computer accessing the affiliate's Web server.

FIG. 3 is a representation of methods and systems for rule-based personalized content delivery according to the present invention, wherein the assembly of the Web page to be viewed by the user is carried out by the computer 120 accessing the affiliate's Web server 130. As shown therein, the user's computer 120 logs onto or otherwise accesses the affiliate server 130's Web site, as shown at 301. The affiliate Web server 130 may then deliver a static Web page to the accessing computer 120, or may dynamically generate a Web page and send the dynamically generated Web page to the accessing computer 120. Whether static or dynamically generated, the Web page delivered to the accessing computer 120 may include code (such as html code, for example) that calls, a shown at 303, the marketing engine 160 to request personalized content, the call preferably including user identification data read from a cookie stored on the accessing computer 120. The marketing engine 160 may include the merchant server 140, the database of user information 142 and the rule base 144. The merchant Web server 140 of the marketing engine 160 receives the collected user identification data and the http request for personalized content, requests and obtains user information corresponding to the received user identification data from the database 142, as shown at 304, and applies the obtained user information to one or more of the plurality of rules stored in the rule base 144, as shown at 305. Based upon the result of the application of the user information to the rules of the rule base 144, the merchant Web server 140 selects content to be posted in the Web page requested by the accessing computer 120 and sends the selected content (either the content itself, such as html code, or an address or pointer to the selected code or content) to the browser of the accessing computer 120, as shown by arrow 306. The browser of the accessing computer 120 may then include the content into the currently displayed (html, for example) Web page. The approach of FIG. 3 has the advantage of having the ability to personalize content to be displayed in a Web page of an affiliate without placing any further processing burdens upon the affiliate Web server 130. Indeed, as most of the transaction of FIG. 3 occurs between the accessing computer 120 and the merchant Web server 140, the method may readily be implemented by affiliates without their own Information Technology (IT) teams, thereby enabling a wide adoption of the present method.

According to the present invention, the selected content may include, for example, an advertisement, a product recommendation or a link to another Web site. For example, the selected content may include a combination of a product recommendation and a deep link into another Web site where the recommended product is featured. Other forms of content, including audio and video may also be selected.

The applicability of the rules of the rule base 144 may be based upon one or more parameters, including time, geography, age, sex, income level, browser type and record of past purchases or inquiries, for example. Values for such parameters may be retrieved, for example, from a profile (stored in the database 142) of the user identified by the user identification data collected from the accessing computer 120. 16. The database of user information 142 may also be updated by the merchant or a third party based upon the (online) activity of the user of the accessing computer 120.

It should be noted that although the present finds advantageous utility within the context of merchant-affiliate relationships, the systems and methods described above and claimed hereunder are not so limited. Indeed, the present systems and methods are applicable to the delivery of personalized content between entities having no such relationship and to users other than those accessing e-commerce sites. For example, the more general "first server" and "second server" phrases may be substituted for "merchant Web server" and "affiliate Web server", respectively.

Hardware Description

Figure 4:
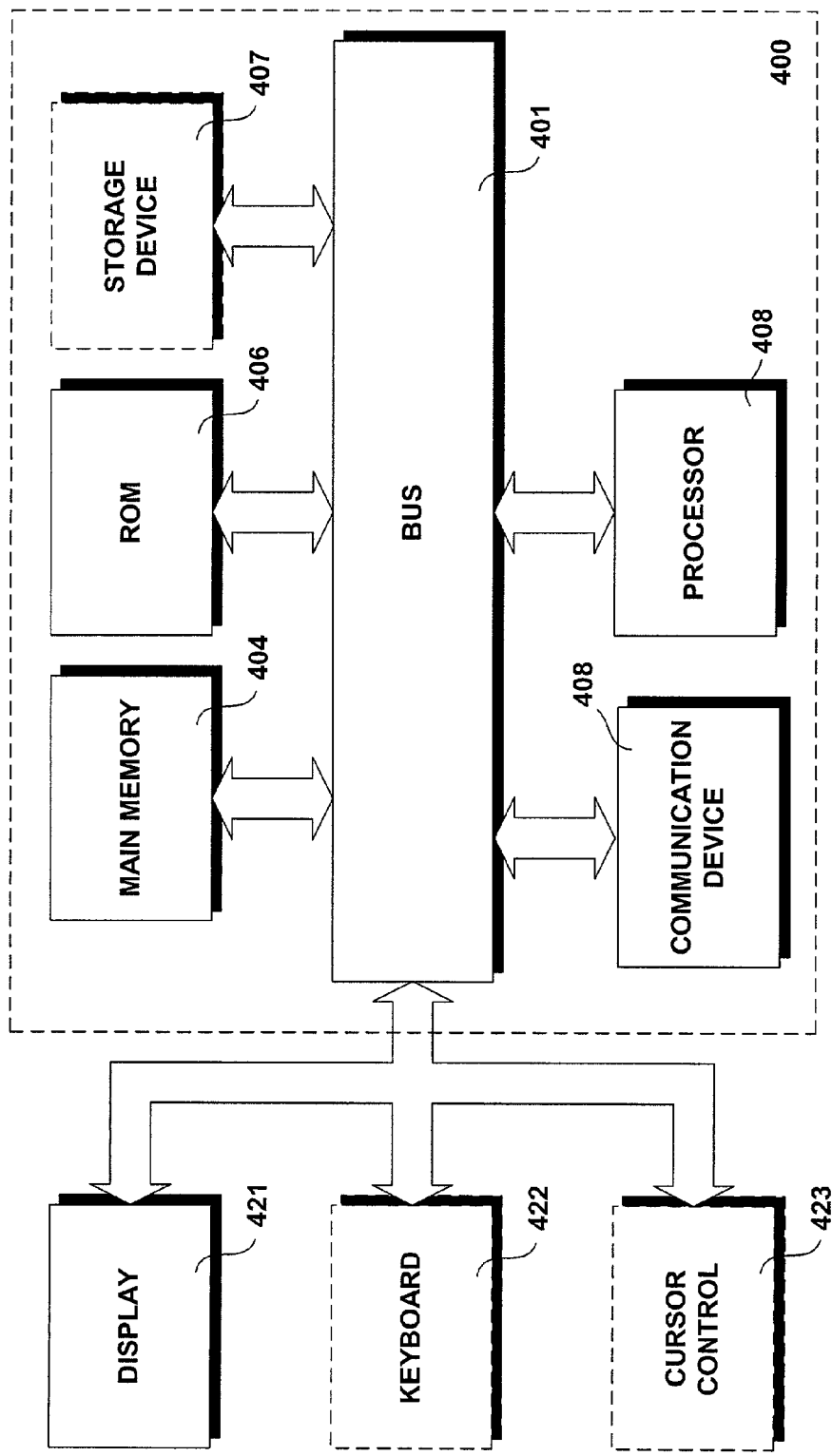
FIG. 4 is a block diagram of a computer system with which the present invention may be implemented.

FIG. 4 illustrates a block diagram of a computing device 400 with which an embodiment of the present invention may be implemented. Examples of such computing devices are shown at reference numerals 120, 130 and 140. Computing device 400 includes a bus 401 or other communication mechanism for communicating information, and a processor 402 coupled with bus 401 for processing information. Computing device 400 further comprises a random access memory (RAM) or other dynamic storage device 404 (referred to as main memory), coupled to bus 401 for storing information and instructions to be executed by processor 402. Main memory 404 also may be used for storing temporary variables or other intermediate information during execution of instructions by processor 402. Computing device 400 may also include a read only memory (ROM) and/or other static storage device 406 coupled to bus 401 for storing static information and instructions for processor 402. A data storage device 407, such as a magnetic disk or optical disk, may be coupled to bus 401 for storing information and instructions. A communication device 408, such as a modem or network (such as Ethernet, for example) card is also coupled to the bus 401 to provide access to a network, such as shown at 150 in FIG. 1.

The computing device 400 may also be coupled via bus 401 to a display device 421, such as a cathode ray tube (CRT), for displaying information to a computer user. An alphanumeric input device 422, including alphanumeric and other keys, is typically coupled to bus 401 for communicating information and command selections to processor 402. Another type of user input device may be user's own voice or cursor control 423, such as a mouse, a trackball, or cursor direction keys for communicating direction information and command selections to processor 402 and for controlling cursor movement on display 421.

The present invention is related to the use of computing device 400 to deliver personalized content to a computer accessing an affiliate Web server. According to one embodiment, the processing may be carried out by one or more computing devices 400 in response to processor(s) 402 executing sequences of instructions contained in memory 404. Such instructions may be read into memory 404 from another computer-readable medium, such as data storage device 407 and/or from a remotely located server. Execution of the sequences of instructions contained in memory 404 causes processor(s) 402 to implement the cart sharing functionality described above. In alternative embodiments, hardwired circuitry may be used in place of or in combination with software instructions to implement the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A method for a first server to select content to be displayed on a computer accessing a Web site of a second server, comprising the steps of:
    the second server collecting user identification data from the computer accessing the Web site;
    the second server sending the collected user identification data and a request for content to the first server;
    the first server retrieving user information corresponding to the user identification data from a database of user information accessible to the first server;
    the first server applying the retrieved user information to a rule base including a plurality of rules;
    the first server servicing the request for content by selecting advertising to be displayed on the second server's Web site based upon a result of the application of the retrieved user information to at least one of the plurality of rules;
    the first server sending an address of the selected advertising to the accessing computer, and
    causing the accessing computer to fetch the selected advertising from the address sent to the accessing computer and to integrate the fetched advertising into a currently displayed page of the Web site.

2. The method of claim 1, wherein at least one of the plurality of rules is customizable.

3. The method of claim 1, wherein the user identification data is included in at least one file stored on the accessing computer.

4. The method of claim 3, wherein the at least one file is configured as a cookie.

5. The method of claim 1, wherein the second sending step is carried out by the second server.

6. The method of claim 1, wherein the selected advertising includes at least one of a product recommendation and a link to another Web site.

7. The method of claim 6, wherein the selected advertising includes a combination of the product recommendation and a deep link into said another Web site where the recommended product is featured.

8. The method of claim 1, wherein an applicability of at least one of the plurality of rules of the rule base is selectively limited by at least one parameter.

9. The method of claim 8, wherein the at least one parameter includes time, date, geography, age, sex, income level, browser type and record of past purchases or inquiries.

10. The method of claim 1, further comprising the step of updating the database of user information based upon an activity of a user of the accessing computer.

11. The method of claim 1, wherein the first sending step sends a request for the selected advertising along with the collected user identification data.

12. A system comprising:
a computer accessing a website;
a merchant Web Server;
an affiliate Web server, the affiliate Web server being coupled to the merchant Web server over a computer network and controlling the website;
a database of user information accessible to the merchant Web server;
a role base including a plurality of configurable roles, the role base being accessible to the merchant Web seller;
a first process within the affiliate Web server to collect a riser identification from the computer accessing the Web site controlled by the affiliate Web server and for sending the collected user identification and a request for content to the merchant Web server along with a request for content;
a second process within the merchant Web server for retrieving user information from the database corresponding to the collected user identification;
a third process within the merchant Web server for servicing the request for content by applying user information obtained from the database to the plurality of roles and for returning an address of selected advertising in response to the request for content, the advertising being selected based upon a result of applying the user information to the plurality of rules, and
a fourth process within the computer accessing the Web site to fetch the selected advertising from the returned address and to cause the fetched advertising to be integrated into the Web site controlled by the affiliate server.

13. The system of claim 12, wherein the user identification data is included in at least one file stored on the accessing computer.

14. The system of claim 13, wherein the at least one file is configured as a cookie and wherein the first process is configured to retrieve the cookie from the accessing computer.

15. The system of claim 12, wherein the affiliate Web server is configured to carry out the fourth process by transmitting the selected advertising to the accessing computer and wherein a browser running on the accessing computer is configured to integrate the fetched advertising into die Web site displayed to the user.

16. The system of claim 15 wherein the affiliate Web server is configured to transmit the selected content via HTTP and TCP/IP.

17. The system of claim 12, wherein the accessing computer is configured to carry out the fourth process.

18. The system of claim 12, wherein the selected advertising includes at least one of a product recommendation and a link to another Web site.

19. The system of claim 18, wherein the selected advertising includes a combination of the product recommendation and a deep link into said another Web site where die recommended product is featured.

20. The system of claim 12, wherein an applicability of at least one of the plurality of rules of the rule base is selectively limited by at least one parameter.

21. The system of claim 20, wherein the at least one parameter includes time, date, geography, age, sex, income level, browser type and record of past purchases or inquiries.

22. The system of claim 12, further including a fifth process to update the database of user information based upon an activity of a user of the accessing computer.

23. The system of claim 12, wherein the first process also collects, from the accessing computer, a request for the selected advertising along with the collected user identification data.

24. The system of claim 12, further including a rules engine configured to enable each of the plurality of rules to be customized and configured to enable a creation of new rules.

25. A method of delivering personalized advertising from a first server to a computer accessing a second server, comprising the steps of:
receiving in the second server a request for the personalized advertising from the accessing computer, the accessing computer having accessed a Web page that includes embedded code configured to send die request for personalized advertising to the first server over a computer network along with selected user identification data;
the first server retrieving user information corresponding to at least one of the user identification data and the accessed Web page from a database of user information accessible to the first server;
the first server applying the retrieved user information to a rule base including a plurality of rules;
the first server servicing the request for personalized advertising by selecting advertising to be posted in the accessed Web page based upon a result of the application of the retrieved user information to at least one of the plurality of rules, and
the first server sending all address of the selected advertising to the accessing computer for posting into the accessed Web page.

26. The method of claim 25, wherein at least one of the plurality of rules is customizable.

27. The method of claim 25, wherein the user identification data is included in at least one file stored on the accessing computer.

28. The method of claim 27, wherein the at least one file is configured as a cookie and wherein the receiving step receives user identification data collected from the cookie stored on the accessing computer.

29. The method of claim 27, wherein an applicability of at least one of the plurality of rules of the rule base is selectively limited by at least one parameter.

30. The method of claim 29, wherein the at least one parameter includes time, date, geography, age, sex, income level, browser type and record of past purchases or inquiries.

31. The method of claim 27, further comprising the step of updating the database of user information based upon an activity of the accessing computer.

32. The method of claim 25, wherein the receiving step is carried out via HTTP and TCP/IP.

33. The method of claim 25, wherein the selected advertising includes at least one of a product recommendation and a link to another Web site.

34. The method of claim 33, wherein the selected advertising includes a combination of the product recommendation and a deep link into said another Web site where the recommended product is featured.

* * * * *

UNITED STATES PATENT AND TRADEMARK OFFICE
CERTIFICATE OF CORRECTION

| | | |
|---|---|---|
| PATENT NO. | : 7,647,387 B2 | Page 1 of 1 |
| APPLICATION NO. | : 09/728724 | |
| DATED | : January 12, 2010 | |
| INVENTOR(S) | : Kiran Gurudutt Bellare et al. | |

It is certified that error appears in the above-identified patent and that said Letters Patent is hereby corrected as shown below:

On the Title page, in Item (54), in column 1, in "Title", line 3, delete "PERSONLIZED" and insert -- PERSONALIZED --, therefor.

In column 1, line 4, delete "PERSONLIZED" and insert -- PERSONALIZED --, therefor.

In column 9, line 21, in claim 12, delete "Web seller;" and insert -- Web server; --, therefor.

In column 9, line 50, in claim 15, delete "die" and insert -- the --, therefor.

In column 9, line 62, in claim 19, delete "die" and insert -- the --, therefor.

In column 10, line 20, in claim 25, delete "die" and insert -- the --, therefor.

In column 10, line 35, in claim 25, delete "all" and insert -- an --, therefor.

Signed and Sealed this

Twenty-eighth Day of September, 2010

David J. Kappos
*Director of the United States Patent and Trademark Office*

UNITED STATES PATENT AND TRADEMARK OFFICE
CERTIFICATE OF CORRECTION

PATENT NO. : 7,647,387 B2  Page 1 of 1
APPLICATION NO. : 09/728724
DATED : January 12, 2010
INVENTOR(S) : Bellare et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1554 days.

Signed and Sealed this

Sixteenth Day of November, 2010

David J. Kappos
*Director of the United States Patent and Trademark Office*